United States Patent Office 3,733,267
Patented May 15, 1973

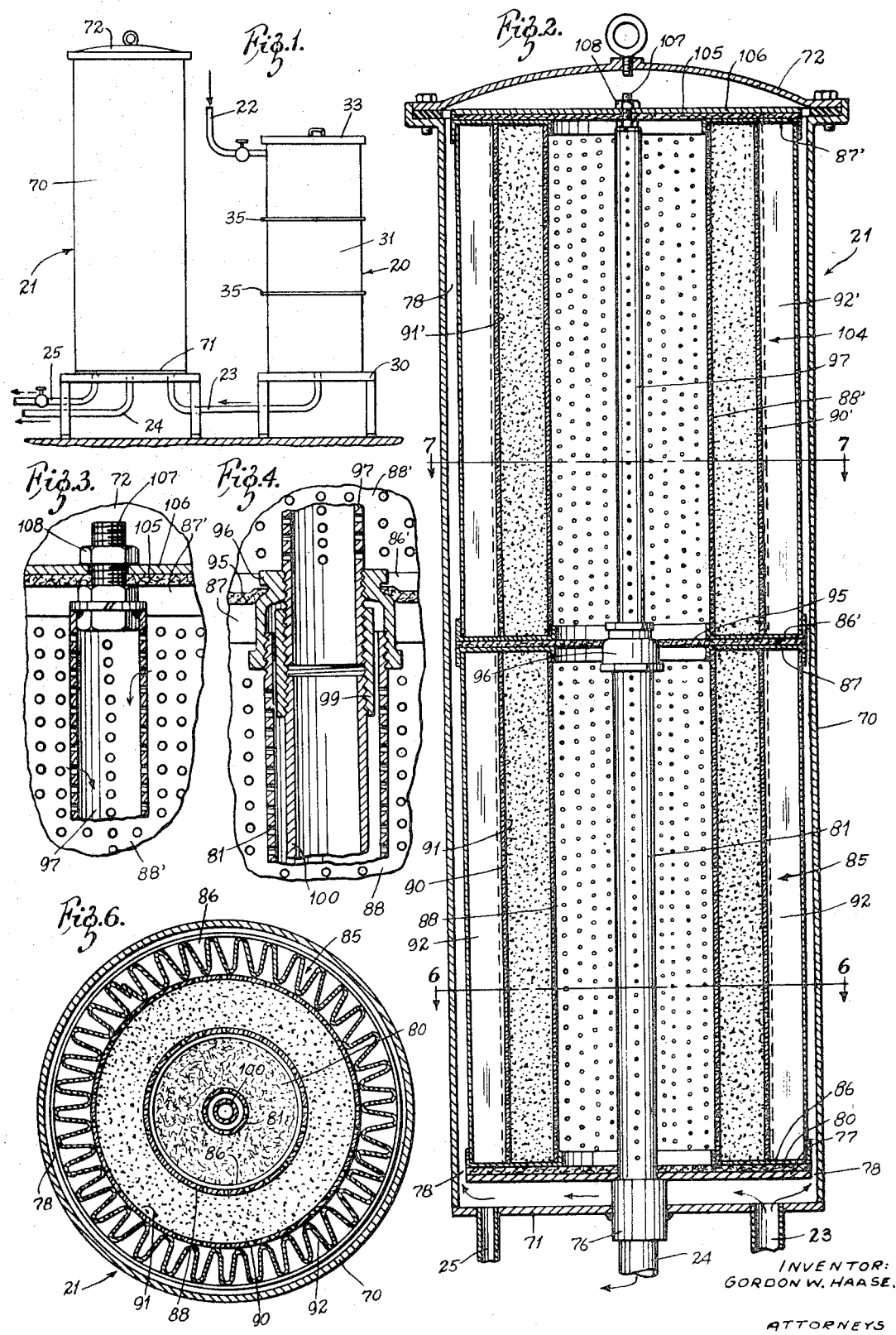

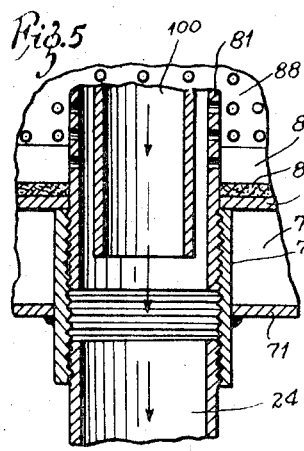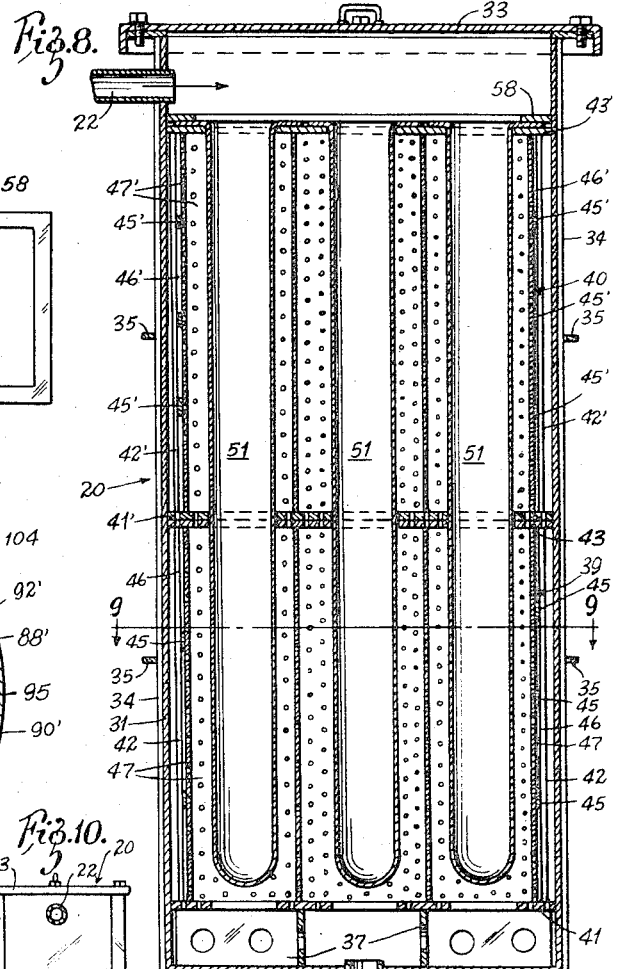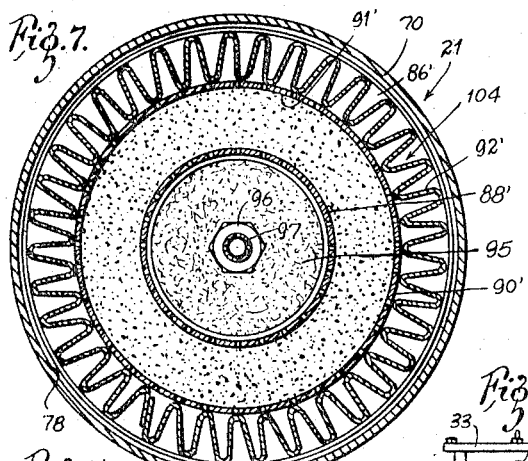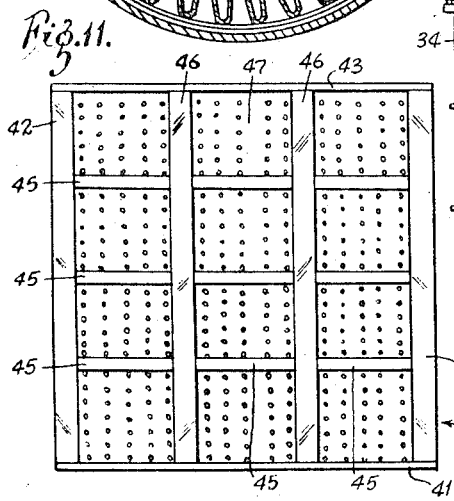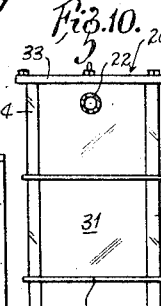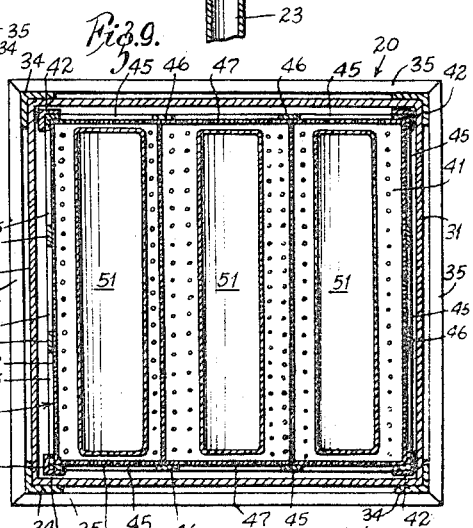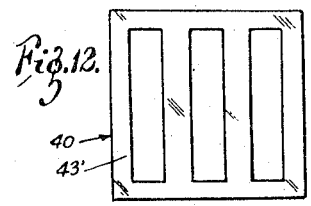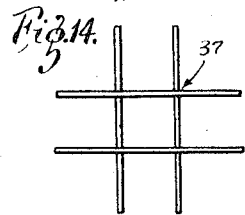

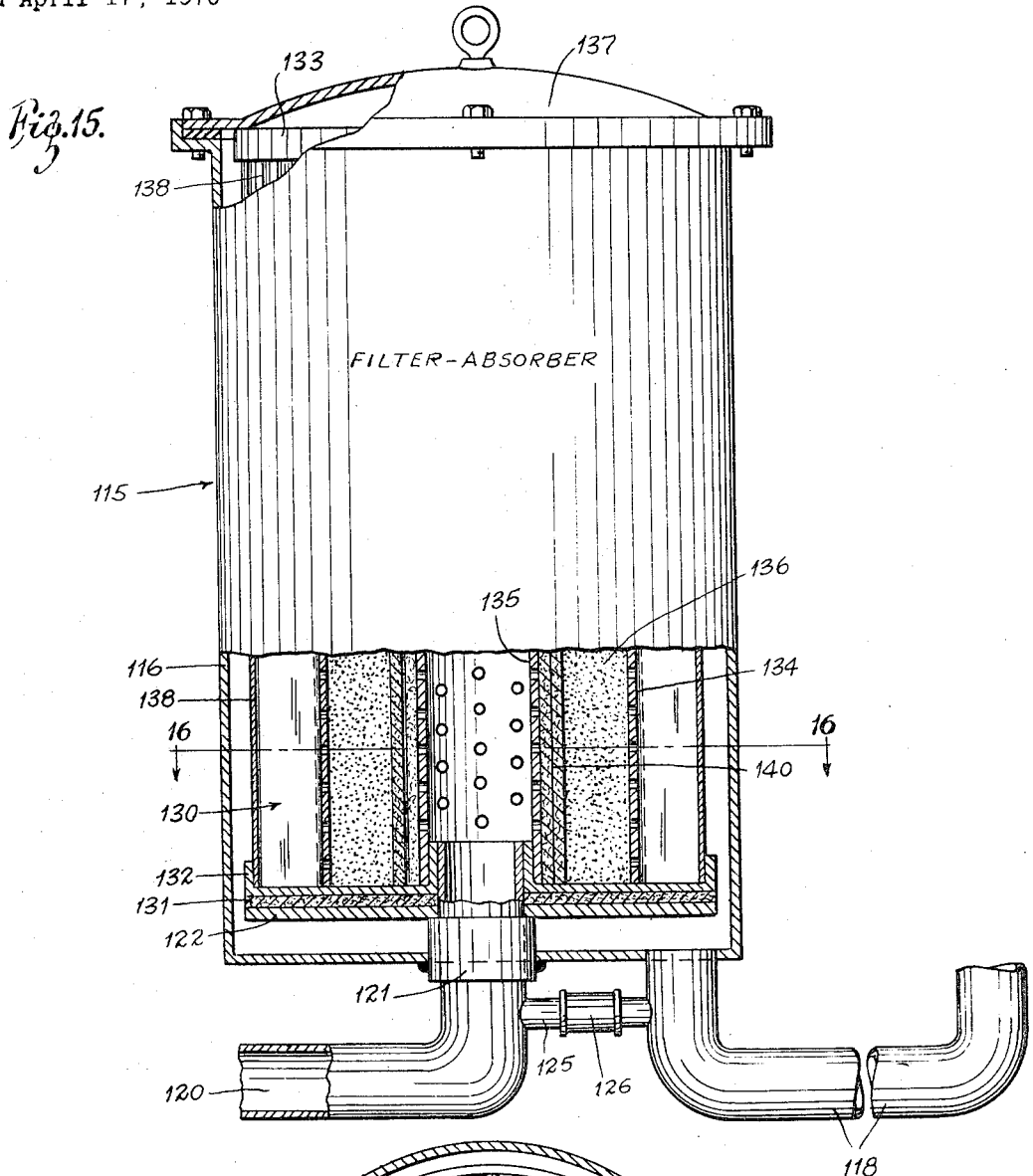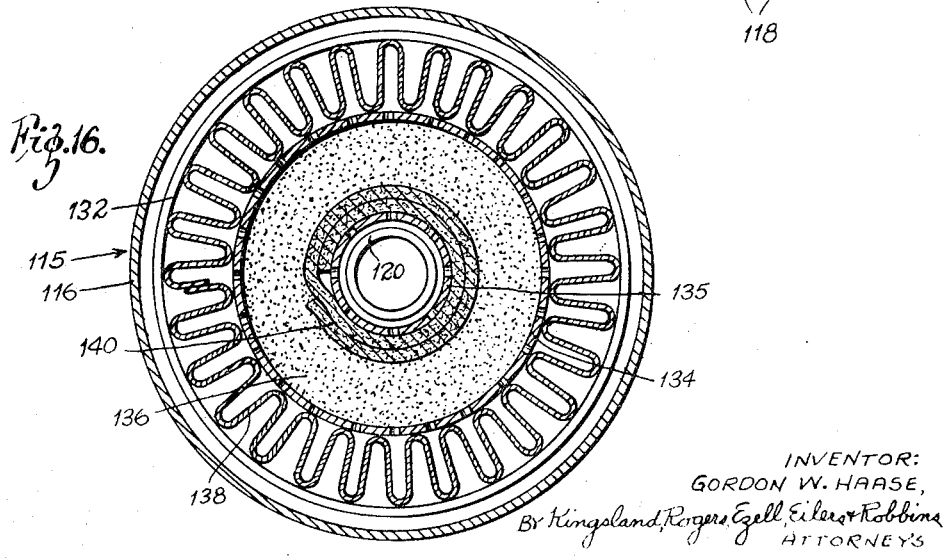

3,733,267
PROCESS OF FILTRATION OF DRY CLEANING FLUID

Gordon W. Haase, Madison, Wis., assignor to Frederick Taussig, St. Louis, Mo.
Filed Apr. 17, 1970, Ser. No. 29,558
Int. Cl. B01d 15/00
U.S. Cl. 210—27                                    4 Claims

ABSTRACT OF THE DISCLOSURE

A method and apparatus, particularly adapted to filtering liquid, consisting of, preferably, a deep-walled fiberbag or similar pre-filter, following by a cross flow filter cartridge comprising a primary filter, surrounding a coarse clay or clay-carbon adsorber unit containing heat-treated attapulgite particles of about 6–25 mesh size. A post-filter can filter out microparticles of clay or carbon.

SUMMARY OF THE INVENTION

The combination of three processing means provides for removal of larger soil particles ahead of the primary filter, which last has heretofore been generally not used because the large particles prematurely clog the primary filter and unduly limit liquid flow. Yet the use of the primary filter ahead of the clay filter-adsorber removes medium particle soils, and in some installations can be relied upon to remove all particles, without the pre-filter. This not only enables the filter-adsorber to be free of at least the major part of its mechanical filtering function, but permits use of clay or clay-carbon particles large enough to permit relatively free flow of liquid through the adsorber since the clay does not have to provide a major filtering function. Larger clay particles can thus be used, reducing the tendency to pack and clog. With the filtering and adsorbing functions separated in this way, the primary filter and clay can be supplied in a unit such as a replaceable cartridge, as they can be made to wear out at the same time.

The primary filter removes small insoluble particles, leaving the filter-adsorber to remove dissolved foreign materials such as fatty acids, colors, oils and water, which it does primarily by an adsorbent function. Further, in operation, the clay "breathes" water, tending to balance water content of the liquid being filtered, despite changes in amounts of water introduced into the liquid.

The post-filter, downstream of the clay or clay-carbon adsorber, can remove superfine particles such as may be sloughed off by the clay or carbon. This prevents these particles from being carried with the liquid back into the system with which the liquid is used. For example, the liquid may be lubricating oil of a diesel engine.

The pre-filter is made with removable and replaceable filter bags having large upright surfaces and small horizontal bottom areas, so that a filter cake may accumulate only to a predetermined thickness range and excess thereafter will fall to the bottom. Only after excess sludge accumulates in the bottom, reducing the wall area below an efficient quantity, must the bags be cleaned.

These bags are preferably separated physically from the remaining components of the system, because their duration of use varies with the quantities of larger soils that in turn vary with the conditions of use of the liquid being filtered. By being separate, the bags may be taken out and cleaned without disturbing the other components. Yet the pre-filter is an important functional part of the preferred system for reasons explained herein.

The filter-adsorber comprises one or more removable and replaceable cartridges. Each comprises a unitary body having an accordion pleated paper filter or other similar filtering medium surrounding a filter-adsorber chamber containing the clay or clay-carbon particles. Pleated filters can be used because the former objections that their interstices became prematurely clogged with coarse soils is eliminated by the use of the pre-filter. The clay particles are heat-treated so as to be quite hard, and because the filterable solids have been removed by the pre-filter and primary filter, the clay particles can be quite coarse, thereby affording better rates of flow. It will be understood that in some installations only the cartridge may suffice, it comprising a primary filter and the adsorber, sometimes with the post-filter.

Other advantages and features will appear hereafter.

In the drawings:

FIG. 1 is a somewhat schematic side elevation of the system;

FIG. 2 is a vertical diametrical section of the filter-adsorber unit;

FIG. 3 is an enlarged sectional fragmentary view of the upper end of the inner discharge pipe of the filter-adsorber unit;

FIG. 4 is an enlarged fragmentary sectional view of the connection between the upper discharge pipe and the lower discharge pipe;

FIG. 5 is an enlarged fragmentary sectional view of the discharge pipes at the bottom of the units;

FIG. 6 is a horizontal section through the filter-adsorber unit, taken on the line 6—6 of FIG. 2;

FIG. 7 is a similar horizontal section through the filter-adsorber unit on the line 7—7 of FIG. 2;

FIG. 8 is a vertical medial section through the pre-filter unit;

FIG. 9 is a horizontal section through the pre-filter unit taken on the line 9—9 of FIG. 8;

FIG. 10 is an elevation of the pre-filter unit taken from the side of FIG. 1, the base being omitted;

FIG. 11 is a side elevation of one of the inner side panels of the pre-filter;

FIG. 12 is a reduced view of the bag holder plate of the pre-filter;

FIG. 13 is a reduced view of one of the horizontal walls of the pre-filter shell;

FIG. 14 is a view of a grid support for the bottom plate of the pre-filter;

FIG. 15 is a view, partly broken away, of a modified filter-adsorber; and

FIG. 16 is a section on the line 16—16 of FIG. 15.

As shown in FIG. 1, the present apparatus includes a larger soil cleaning or pre-filter section 20 and a filter-adsorber section or "tower" 21, connected in series in a liquid line. A valved inlet pipe 22 connects into the top of the unit 20, and conducts the fluid or liquid to be treated into the present apparatus. A connecting pipe 23 connects the lower or discharge end of the pre-filter 20 into the lower or intake end of the filter adsorber unit 21. A discharge pipe 24 leads also from the bottom of the unit 21 to conduct the processed fluid back into the system with which it is used. A clean-out pipe 25 with a cut-off valve, as illustrated in FIG. 1, is provided in the bottom of the unit 21.

Various fluids, after having been used for a period of time, become polluted with an excess amount of water, certain oils, water-soluble colors, fatty acids, small solid particles, lint and the like. All of these are removed by the present apparatus.

For reasons to appear, it is highly desirable to remove the larger particulate impurities first and to do so in a manner that does not destroy the mechanical filtering properties of adsorber unit before the adsorbent requires replacement or regeneration.

The pre-filter unit 20 can be placed upon a base 30, if desired, although the base is not an operating part of the unit. An outer shell 31 has unitary side and bottom walls, the top edge being flanged outwardly around the top opening. The inlet pipe 22 enters the shell 20 near the top at one side and the discharge pipe 23 is secured into the bottom wall in the manner illustrated. A removable cover 33 is secured around the flange at the top of the shell and bolted thereto to enclose the shell.

As illustrated, the shell is reinforced by angles 34 at the corners and horizontal straps or bands 35 at intervals along the sides.

A grid 37 comprising cross strips secured together is located in the bottom of the shell wherein it may fit loosely so as to permit easy communication throughout the bottom of the shell. The grid 37 affords a support for the lower of a plurality of superposed filter shells, there being two shells 39 and 40 illustrated.

These shells may be identical, so only the lower need be described in detail. It has a perforated bottom wall 41, vertical angular corners 42 secured to the upper surface of the bottom 41, and joined at their upper ends to an upper perforated horizontal wall 43, that may be identical to the panel 41.

The angular corners are connected by horizontal strips 45 welded to the angles, and to vertical strips 46. These form a frame, to which perforated side plates 47 are welded. As noted, the side walls 47 are perforated throughout with a large number of small holes to permit the free passage of liquid through the panels and downwardly through the bottom wall 41 toward the discharge pipe 23. As the drawings show, the horizontal walls 41 and 43 have small perforations and several (here three) elongated openings. The latter are to receive the lint-filter bags, as will appear.

The upper shell 40 may be identical to the lower, its parts being numbered in the drawings with the same numbers, primed, as those applied to the lower shell 39. Its top horizontal wall 43' does not require the small perforations. It is preferred to make all these walls identical, to permit free interchange of components as well as of shell assemblies.

A plurality of deep filter bags 51, preferably as much as six times as deep as they are across, are then fitted down into the shells. As shown, there are three filter bag receptacles. The bags 51 are made of a polyester monofilament cloth, flared outwardly over the top wall 43' of the topmost shell 40. A rectangular member 58 rests over the flared parts to hold them. In this way the bags are supported on the top panel 43' but hang through the upper and lower sections of this filter to adjacent the bottom thereof. The total filter space is the total wall area of all the sections 51 below the top panel 43'. It can be seen that liquid enters the inlet 22 to fill the bags 51. As noted, there needs to be one such bag although more are preferred. The liquid can pass through the walls thereof, and then through the perforated shells 47 and 47', these walls not interfering with flow even when the bags hang in contact with them. The filtrate descends past the members 41', 43 and 41 and the walls 47' and 47, to the bottom of the unit, thence, around the grid 37 to flow out the discharge pipe 23. The filter bags can be replaced when necessary by removing the top 33, lifting off the hold-down frame 58, lifting out the bags, cleaning and replacing or inserting a fresh set of bags, and restoring the hold-down plate 58 and the cover 33.

Following the filtering in the unit 20, the liquid flows through the pipe 23 into the bottom of the tower unit 21. This unit is illustrated as having two superposed filter-adsorber cartridges in it. By its construction, the unit 21 can be made relatively small, a feature of value because of the limited space available in many establishments. The filter-adsorber, being separate, does not restrict the size of the pre-filter which may be larger or smaller to accommodate the particular conditions in which the system is to be used. Furthermore, each unit may be separately cleaned out without disturbing the condition of the others.

The unit 21 has an outer shell 70, here illustrated as being cylindrical with a bottom 71 to which the cylindrical shell 70 is secured and sealed, and a removable cover 72.

The inlet 23 opens into the bottom 71, and the drain outlet 25 also leads from that member. The liquid outlet 24 extends from the center of the bottom 71. It includes a pipe coupling nipple 76 welded to the bottom 71, and projecting upwardly within the shell, to support a shelf or plate 77. The plate 77 does not extend completely to the inner surface of the shell 70, leaving an annular fluid passage 78 around its periphery.

Above the plate 77 there is a felt pad 80 that is substantially coterminous with the plate and does not obstruct the passage 78. Both the felt pad and the plate 77 surround an upstanding extension 81 of the discharge pipe 24 threaded into the nipple 76 (FIG. 5). This pipe 81 is perforated as will be described.

A combination filter-adsorber cartridge 85 is mounted on the felt pad 80. This cartridge includes an outer filter paper surrounding an annular chamber containing an adsorbent filter material of a granular nature. Under certain conditions, a different filter material may be placed around the annular chamber, such as felt, as will be described. However, paper is usually preferred.

The filter cartridge 85 has a flanged bottom ring 86 and a flanged top ring 87 that may be of a plastic material such as glass filled epoxy compound or other material not affected by the substances being treated. An inner perforated cylinder 88 of like material is secured to the inner flanges of the two rings 86 and 87. There is also a larger concentric cylinder 90, also perforated, and of like material, imbedded into the rings 86 and 87 midway between the flanges. The two cylinders 88 and 90 provide between them an annular chamber or space 91 that contains the granular material referred to. Outside of the cylinder 90 is disposed a primary filter, usually in the form of an accordion type paper filter 92, contained between the flanges on the rings 86 and 87, and held radially by the flanges on the rings and the cylinder 90. The cartridge 85, consisting of the primary filter and the granular material in its chamber, is installed as a unit onto the felt 80.

In the present example, there is a second cartridge above the first. Any number of such cartridges may be used. To give some idea of the size of this equipment in a typical installation, a cartridge may be about 18 inches high, for some uses. It may be smaller or larger, depending upon the requirements.

There is another felt pad or disc 95 placed across the top of the cartridge 85 and extending out to the periphery of the cartridge, leaving a passage around the periphery. This felt pad or disc 95 has a center opening to receive a reducing union 96 shown in section in FIG. 4. The lower end of the union 96 threadedly receives the upper end of the perforated pipe 81. The upper end of the union 96 receives the lower end of a perforated pipe 97 smaller than the pipe 81. The pipe 97 projects down into the union and is connected by a nipple 99 to the top of an imperforate pipe 100 that continues down to the bottom of the shell 70 is discharge into the pipe 24 adjacent the bottom of the pipe 81 as shown in FIG. 5.

Above the felt disc 95 the cartridge 104 may be identical with the cartridge 85 and need not be described in detail. Its components may be referred to by the same numbers as used for the unit 85, with primes. Over it there is a felt disc 105 surmounted by a plate 106, both of these two being circular and terminating short of the inner walls of the shell 70 to permit liquid flow around their peripheries. The pipe 97, which is the discharge pipe for this upper cartridge, has a threaded stud 107 projecting upwardly and passing through central holes in the felt pad 105 and the plate 106. A nut 108 is turned down to press the plate 106 against the felt pad 105 and the top ring 87' of the upper cartridge 104 to hold both cartridges solidly in place, clamped between the top plate 106 and the bottom plate 77.

The annular chambers 91 and 91 in the two units are filled with a special filter adsorbent material. It consists of a light tan attapugite magnesium-aluminum-silicate clay with low or minimal iron content, preferably that obtained from the southerly end of the Georgia-Florida clay deposits, as, for example, those coming from northwest Florida. A typical analysis of the clay on a volatile-free basis is as follows:

|  | Percent |
|---|---|
| $SiO_2$ | 66.8 |
| $Al_2O_3$ | 11.8 |
| MgO | 12.0 |
| $Fe_2O_3$ | 4.1 |
| CaO | 1.6 |
| $K_2O$ | 1.1 |
| $TiO_2$ | .6 |
| Other | 2.0 |

The clay must be dried so that it will resist disintegration in water or liquid being treated, and in fact, must be dried to a higher than usual amount. It has been found that drying it to about 1100° to 1200° F. is required for many uses, such as for treating dry cleaning fluids. In one process of preparation, the clay prior to drying is extruded and then broken into smaller particles, screened and dried for a period of something over an hour at the given temperature. This produces a product with a free moisture of not over about 2%.

This exemplary material has a pH of about 7.5 to 8.5, a combined moisture approximately 6–8%, specific gravity of about 2.5, a pole volume in milliliters per gram of about .38 to .52, and a packed bulk density in pounds per cubic feet of 36–38.

The size of the particles is important in this application. It has been found that about 6–25 mesh will work in this application but 8–16 mesh is the preferred range. If the material is too fine, flow-through is not great enough and packing may occur. If it is too coarse, there is inadequate dwell of the material being treated and insufficient adsorption. If the material is not heat-treated to a sufficiently high temperature, it disintegrates in the liquids to be treated.

The clay particles are mixed with particles of adsorbent carbon, in the preferred arrangement. This carbon may be charcoal in 12–20 mesh sizes. The clay material fills the two annular chambers 91 of the two cartridges 85 and 104. The paper filters 92, which are here shown as accordion shaped to provide the greatest amount of filter space per linear dimension can be a commercial filter paper typically that used for swimming pool filters, and should be capable of filtering out particles larger than about 1½ microns.

It can be seen that the total system comprises a coarse pre-filter that can remove gross solids such as lint and the like occurring in used dry cleaning fluid, for example, before the liquid reaches the paper filters. The paper filters then remove the finer particulate solids. The adsorbent filter functions primarily to remove non-volatile residues, including soluble dye stuffs as well as water soluble dyes water in a manner to be described, oils, fatty acids, water soluble and solvent-soluble soils and the like.

Modification of FIGS. 15–16

In FIGS. 15 and 16 a modification of the cartridge filter-adsorber unit is generally designated 115. This embodiment may be of special use for filtering lubricating oil of engines, such as diesel or internal combustion engines, or other applications where it is useful to insure that no superfine particles are present in the liquid that flows back to the point of use.

The unit 115 can be used with or without the prefilter 20, depending on the need to remove gross solids that interfere with or reduce the period of efficient use of the primary filter to something below the period of use of the adsorber.

The unit 115 includes a shell 116 as before, here illustrated as sized to receive a single cartridge. The cartridge is mounted in the shell. In this case the central pipe is not necessary, as the lower volume of liquid flow permits use of a small diameter to the inner cylinder of the cartridge.

Accordingly, the shell 116 receives the inlet pipe 118 for bringing the liquid to the cartridge. It may, if desired, lead from a pre-filter as before, or not. Usually in the case of engine oil filtration, the pre-filter is not used. The outlet pipe 120 also connects through the bottom of the shell 116, and is secured into a nipple 121 that supports a circular plate 122 above the bottom of the shell.

In the case of an engine oil filter, by-pass means is provided to prevent blockage of oil for the engine. Here a pipe 125 diagrammatically represents such by-pass and is controlled by a pressure-responsive, spring-closed check valve 126, which admits by-pass flow whenever the pressure drop from the inlet 118 to the outlet 120 exceeds a predetermined value. Normally only a fraction of the oil is passed through the filter.

The filter cartridge 130 is basically similar to the cartridge 85. It rests on a felt pad 131 on top of the plate 122, and has bottom and top flanged end rings 132 and 133, respectively, that are held together by an outer perforated cylinder 134 and an inner perforated cylinder 135 that form between themselves a chamber 136 for the adsorber clay granules as before, with or without carbon.

In this case, the inner opening of the bottom ring 132 can fit over and be centered by a short projection of the outlet pipe 120. The cartridge at the top may be held down by the cover 137 that is bolted to the shell 115 as shown. Appropriate gaskets may be used, solid or permeable, to prevent or to restrict any liquid from by-passing the filter.

A paper filter 138, arranged in corrugations, as before, is the preferred primary filter. In filtering engine oil, a large number of smaller accordion pleats is preferable, because the solids to be removed are usually fine and do not quickly clog the filter.

In this cartridge, means are illustrated that filter out any superfine particles that have passed through the filter-adsorber means, including any particles of clay or carbon picked up in the chamber 136. This post-filter means comprises a sheet of felt 140 wrapped twice around the inner cylinder 135 inside the chamber 136.

Use and operation

This system is adapted to be interposed in the circulating pipes of the liquid to be treated. We shall first describe it in connection with FIGS. 1–14, which embodiment is peculiarly adapted for use with liquids that have picked up larger soils that tend to clog fine filters such as the primary filters here illustrated.

The liquid can flow continuously inwardly through the inlet pipe 22, to fill the several bags 51. These filters have a large vertical surface compared to the horizontal surface, and, in fact, their principal filtering surface is vertical. The bags can be made of a polyester monofilament which facilitates cleaning because this material does not provide the characteristic interstices of a woven cloth or ordinary fiber, which catches and holds certain soils such as fibrous particles.

As is evident, with the bags 51 full of liquid, the liquid flows through their walls from top to bottom subject to gravity, and the circulating pump pressure. In a normal cycle of operation, particles, especially fibrous types, form a mat over the total filter surface. Since the bag walls are principally vertical, they can support only so much of a mat. After a period of time the accumulation forms a desirable filter "cake" or mat, but further deposits cannot be sustained and fall to the bottom of the bag. This leaves a consistent matted area or filter mat lining the walls of the bags with an approximate thickness of 1/16 to 1/8 of an inch.

The resulting effect of this design is a self-cleaning filtration surface which catches foreign materials, the filtering being produced by the combination of the bag plus the layer of matted particles. It is desirable to clean this filter trap only when absolutely necessary due to a heavy build-up on the bottom of the filter bags, as the mat requires a certain time to build up again after the cleaning has taken place.

A notable other advantage of this type of pre-filter is that it does not become seriously clogged except after a very long period of use. A pre-filter that becomes clogged soon in a normal installation in a plant quickly reduces the rate of flow of the fluid through the system. Accordingly, heretofore pre-filters have been avoided. Yet the absence of a pre-filter can mean that the paper filter subsequently used primarily for other kinds of filtration is rapidly clogged by the presence of the large or fibrous types of particles accumulating on it with a rapid build-up of back pressure and liquid flow resistance. This does not occur when the present pre-filter is combined with a paper filter.

The liquid fills the unit 20. It flows through the bags 51, is filtered thereby, fills the spaces within the shell outside of these bags, flows out through the perforated inner shells 47 and 51, downwardly to the bottom of the unit, and out the outlet 23.

The liquid thus freed from the large particles passes by way of the pipe 23 into the bottom of the unit 21. It passes around the outside edges of the solid steel plate 77 and upwardly around the cartridges 85 and 104, outside of the felt 105 and the plate 106 so that it entirely fills the interior of the unit 21.

Liquid thus stands outside of the two accordion paper filters 92 and 92'. These paper filters remove the solids that have flowed through the unit 20, typically down to 1½ microns in size. The quantity of solids required to be eliminated by the paper filters is much smaller than it would be without the pre-filter. Heretofore, use of paper filters in this process has been restricted because the pleats were too often quickly clogged by the accumulation of particles. But absence of paper filters can leave the adsorbent overloaded with a filtering function.

The liquid that passes through the paper filters 92 and 92' flows through the outer perforate cylinders 90. In the drawing, the perforations are exaggerated in size relative in size to the particles inside for purposes of clarity, since these perforations must be smaller than the particles. The general direction of flow with the element 21 filled with liquid is laterally through chambers 91, thereby passing through the bed of adsorbent filtering material.

This clay material can remove fatty acids, water soluable soils, and dyes, and excess water; and the carbon component removes solvent-soluble soils and dyes, and deodorizes the liquid. Thus, water soluble soils that can pass through the two preceding filtration means are adsorbed by the clay. As noted, the clay particles are hard and relatively large, since the filtering functions have already been performed to remove solid soil particles. Also the particles are not susceptible to disintegration in the liquid, which may have a water component. The relatively large particles permit a free flow of liquid, and more rapid circulation. They are much less subject to clogging and packing than smaller sizes, yet can present adequate surface area and pore volume to remove the undesirable dissolved and certain colloidal soils.

In a typical system for one type of use, such as for dry cleaning, the dimensions of the unit 20 are approximately as follows: Each inner generally rectangular perforated shell unit is approximately 1 foot on the side and approximately one foot tall. Each bag 51 is a little less than 2 feet deep, about 2½ inches wide by about ten inches in section, as in FIG. 9. These dimensions are not critical but it is desirable to have approximately as much as 1.4 square inches of vertical area per gallon of liquid flow for a typical dry cleaning fluid.

Characteristic dimensions for a tower 21 to be used with the lint filter 20 are that it is about 40 inches high. Since each of the inner cartridges 85 is about 18 inches high and 13½ inches in diameter, the outer diameter of the shell 70 is 20 or 21 inches. Typically, the cylinder 90 can be about 10 inches in diameter and the cylinder 88 can be about 6⁷⁄₁₆ inches in diameter. The paper filter 92 in this illustrative installation is 324 inches long and 18 inches high. Made with 110 pleats 1½ inches deep (approximately), the walls of the pleats are sufficiently far apart that the areas between pleats do not foul with solid deposits such as carbonaceous material from the fluid. Smaller units can be made with fewer bags and fewer cartridges, especially for conversion units. See the description to follow.

A reason for putting the pre-filter 20 separate from the tower 21 is that the bag filters tend to become clogged after different periods of use than do the elements of the tower 21. For instance, if materials are being filtered which are peculiarly linty or peculiarly dirty with large dirt particles, the filter 20 can become fouled beyond efficient operation relatively soon. In this case, there will be such a buildup of sludge in the bottom of the bags that they have to be taken out and either replaced by new bags or cleaned and replaced. However, normally the bags do not wear out as soon as the cartridges 85–104.

Because the pre-filter is present, the paper filter and clay filter of the tower 21 can be designed so that in normal usage they become clogged at about the same time. In the typical installation being discussed, the particulate filter space 91 will have eight pounds of clay particles and eight pounds of carbon particles per cartridge, and this material is rendered useless at about the same time as the 324 inches of paper, 18 inches high.

Because, as noted, the entire shell 70 of the tower 21 is normally full of liquid, the lower cartridge has a greater hydrostatic head than the upper. If this were not accommodated, there would be a greater flow through the bottom cartridge than through the upper one. To prevent this, the tube 81 has fewer or smaller holes in it than does the pipe 97 at the axis of the upper cartridge. Therefore, the back pressure against flow through the lower cartridge is greater than that through the upper cartridge. This can be so arranged that there is substantially an equal flow through both cartridges. If there were three or more cartridges, instead of two, there would be a corresponding increase in the number or size of the perforations as cartridges are stacked one above the other.

One of the particularly desirable features of the present system is an apparent "breathing" effect of the clay particles, thought to function as follows. Normally, certain fluids that can be filtered, such as perchlorethylene, contain a small quantity of water and detergent. For example, at a 75% relative humidity, there may be 3/100 pounds of water per one hundred pounds of solvent. However, as the relative humidity in the ambient atmosphere increases, the moisture may exceed the amount that can be emulsified by the detergent, and which may remain in suspension in the liquid that goes through the filtering operation. As the liquid is reused, the water content may accumulate even to a deleterious level.

With the present system, the excess moisture in the cleaning liquid is circulated with the liquid through the clay filter adsorber. The clay has the property of adsorbing this moisture up to a point of equilibrium, reducing the amount of water in the fluid, bringing the quantity toward normal. Unexpectedly, when the humidity decreases so that there may be insufficient water, especially for the amount of detergent present, the clay through which the liquid passes, gives up water and tends to restore the ratio of water in the liquid back to normal.

Apparently, this comes about from a condition of preferential wetting, because the desired mean ratio of water to other components in the liquid with detergent passes across the equilibrium point for preferential adsorption of water by clay relative to its adsorption by the perchlorethylene detergent mixture.

Operation of the example of FIGS. 15 and 16 is as follows: The liquid to be filtered, such as the lubricating oil of a diesel engine, flows in the pipe 118. It may have been pre-filtered, although this is usually unnecessary for engine oil because the particles are small and not as dense as in other liquids.

The usual by-pass 125 with the spring-closed check valve 126 is provided. The engine oil has two paths between the inlet 118 and the outlet 120, the by-pass 125 and the filtering path. In use, the oil is forced by the pump into the shell 115, which it fills, and is urged through the paper or other primary filter 138, the outer cylinder 134, and thence through the adsorbent 136, the felt post-filter 140, the perforated cylinder 135, to the outlet 120.

Usually the back pressure through the filter causes the liquid pressure in the by-pass to build up until the valve 126 opens, and the principal liquid flow is through the by-pass. However, a portion of the oil always passes through the filter, and the process is adequate to keep the oil clean.

As the oil passes through the primary filter 138, which is preferably a fluted paper filter of fine micron paper with many folds tightly packed in the cartridge, the solid particle soils are removed. Then it passes through the adsorbent chamber 136, where water, acids, and other impurities are removed by the clay or clay-carbon mixture, which has the same characteristics as set out previously in this specification.

As the oil might pick up some superfine particles from the clay-carbon granules, the post-filter 140 is provided, consisting preferably of a sheet of felt wrapped twice around the inner cylinder 135. This filters such particles out, and the cleaned oil can return to the engine through the pipe 120.

It has been found that engine oil for internal combustion engines can be filtered with the filter of FIGS. 15 and 16, and used for tens of thousands of miles. At proper times, depending upon conditions of operation, the cartridge unit 130 is replaced by a new cartridge.

A typical size of the filter of FIGS. 15 and 16, as used in automobiles, is a 4″ x 6″ cannister, the inner cylinder or core 135 being ½″ in diameter, and the felt sheet being 1/16″ inch. The chamber 136 holds clay or clay-carbon mix.

A typical diesel engine filter size is 8″ x 14″ tall, with the inner core 1 1/16″ diameter, the felt 1/16″ thick wrapped twice around, and preferably stitched into cylindrical shape. Six pounds of clay or clay-carbon mix are used.

In either case the paper filter performs the principal filter function of the cartridge to remove foreign particles in the oil coming from the engine. This permits using larger and harder particles of clay, that thereby are much less subject to becoming packed together by the liquid so that they develop excessive back pressure.

Other materials can be filtered by the present system, such as machine tool cutting compound that accumulates particles of metal and the like. In this case, a pre-filter combination is preferred.

Various changes and modifications may be made within this invention as will be readily apparent to those skilled in the art. Such changes and modifications are within the scope and teaching of this invention as defined by the claims appended hereto.

I claim:

1. In a process for removing soils and the like from a dry cleaning fluid: the steps of filtering the fluid to remove undissolved particles from the fluid by flowing said fluid through a fluted paper filter, and thereafter passing the filtered fluid through a mass of attapulgite clay particles of from about 6 to about 25 mesh that do not slake in water, to remove adsorbable material.

2. In the process of claim 1 the filtering steps including:
   flowing the fluid through a pre-filtering device and pre-filtering the larger solid particles from the fluid, to enable the fluid to be passed through said fluted paper filter without clogging the flutes with larger solids;
   then flowing the fluid thereafter through said fluted paper primary filter to remove filterable solid particles therefrom that passed through the pre-filter.

3. In the process of claim 1: the steps of passing the fluid into a receptacle that contains cartridge means and causing the fluid to fill the receptacle to the top of the cartridge means; causing the fluid to bear laterally upon and to flow laterally through vertically disposed paper filter flutes; thence causing it to flow laterally into and through a column of clay particles and into a discharge area for passage from the receptacle.

4. The method of claim 1 wherein said attapulgite particles are from about 8 to about 16 mesh.

References Cited
UNITED STATES PATENTS

| | | | |
|---|---|---|---|
| 3,493,117 | 2/1970 | Tuffnell et al. | 210—266 |
| 3,520,417 | 7/1970 | Durr et al. | 210—266 X |
| 3,212,641 | 10/1965 | Komarmy et al. | 210—266 |
| 2,369,857 | 2/1945 | Russell et al. | 210—282 |
| 2,968,633 | 1/1966 | Weir | 252—455 R |
| 3,295,689 | 1/1967 | Arvanitakis | 210—259 |
| 2,250,299 | 7/1941 | Downing | 210—282 |
| 2,736,436 | 2/1956 | Fresch | 210—282 |

SAMIH N. ZAHARNA, Primary Examiner

U.S. Cl. X.R.

210—282